United States Patent
Rajan

(10) Patent No.: US 7,818,231 B2
(45) Date of Patent: Oct. 19, 2010

(54) METHOD TO INCREASE COLLECTION OF DEBTS OWED TO GOVERNMENT

(75) Inventor: Balaji S Rajan, Huntley, IL (US)

(73) Assignee: Financial Management Systems, Inc., Schaumburg, IL (US)

( * ) Notice: Subject to any disclaimer, the term of this patent is extended or adjusted under 35 U.S.C. 154(b) by 273 days.

(21) Appl. No.: 11/964,954

(22) Filed: Dec. 27, 2007

(65) Prior Publication Data

US 2008/0215392 A1 Sep. 4, 2008

Related U.S. Application Data

(60) Provisional application No. 60/882,073, filed on Dec. 27, 2006.

(51) Int. Cl.
*G06Q 40/10* (2006.01)
(52) U.S. Cl. ......................................................... 705/35
(58) Field of Classification Search .................... 705/35
See application file for complete search history.

(56) References Cited

U.S. PATENT DOCUMENTS

| | | | |
|---|---|---|---|
| 7,403,942 B1* | 7/2008 | Bayliss | 707/5 |
| 2004/0179672 A1* | 9/2004 | Pagel et al. | 379/266.1 |
| 2005/0216385 A1* | 9/2005 | Schneider | 705/35 |
| 2006/0271450 A1* | 11/2006 | Cohen et al. | 705/30 |

OTHER PUBLICATIONS

Rubenstein, Steven, "Security scare diverts SFO flight / Passenger's name appeared on FBI list" Jul. 2, 2002, San Francisco Chronicle.*
No Author, Fact Sheet -FMS Debt Collection and The Debt Collection Improvement Act of 1996, 1996.*

* cited by examiner

*Primary Examiner*—James P Trammell
*Assistant Examiner*—Abdul Basit
(74) *Attorney, Agent, or Firm*—Miller Matthias & Hull LLP

(57) ABSTRACT

A method of increasing the collection of debts owed a government agency by collecting additional names associated with a debtor, verifying that an additional name represents the same person as the debtor, and providing those additional names to the government agency that is owed by the debtor. After the additional names are added, future payments to the debtor can be offset by the amount owed.

19 Claims, 1 Drawing Sheet

METHOD TO INCREASE COLLECTION OF DEBTS OWED TO GOVERNMENT

BACKGROUND

1. Field of the Invention

Figure 1:
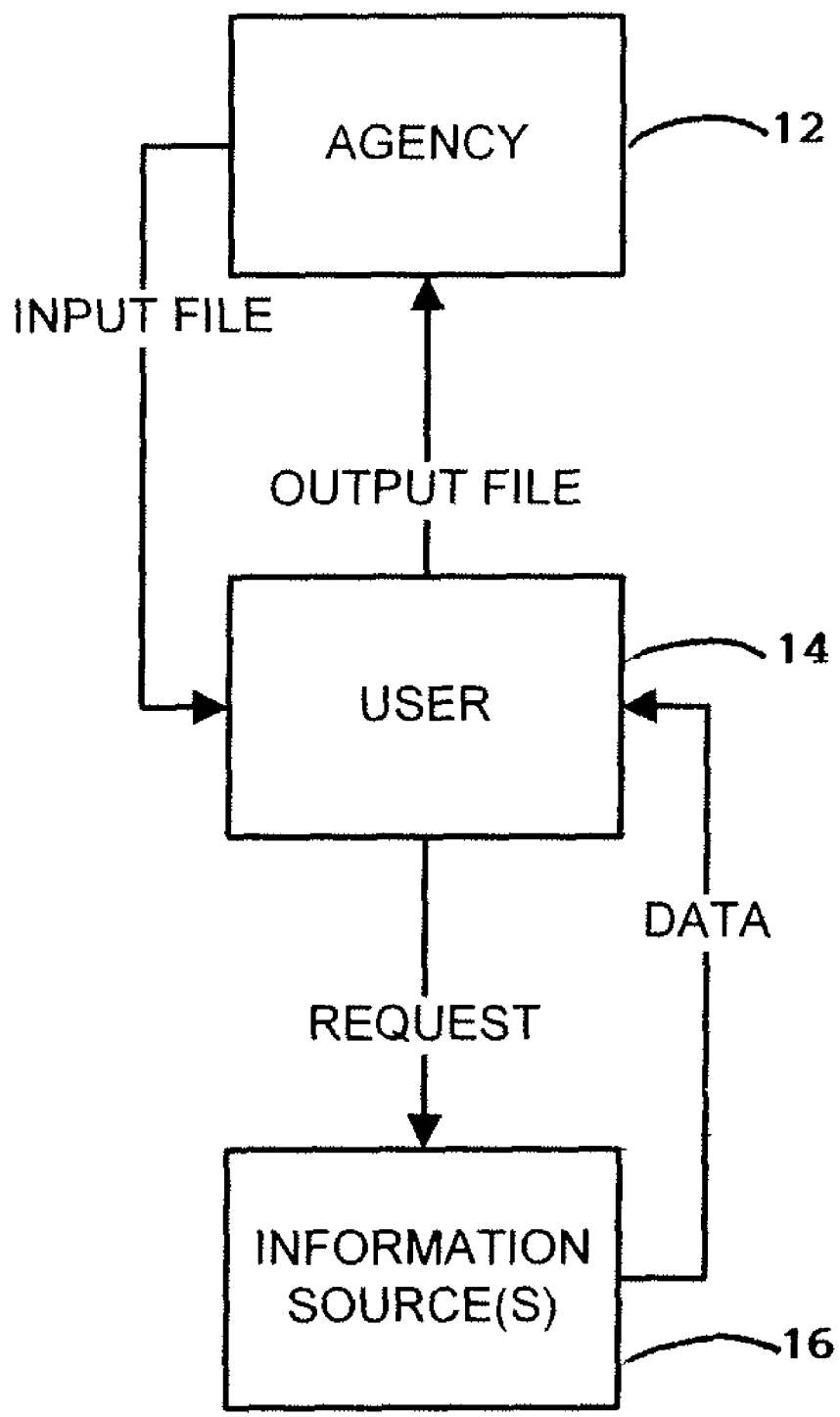

This patent relates to a method to enable a government agency to increase collection of debts owed to the agency by debtors by providing data to the agency that results in offsetting government payments to such debtors to repay the debts.

2. Description of the Related Art

Federal agencies are authorized to collect delinquent debts owed to a government agency by offsetting Federal payments due to individuals or businesses that may owe these debts. Federal agencies send information in a specified electronic file format to the U. S. Department of the Treasury's Treasury Offset Program (TOP) containing delinquent debts. The file comprises debtor name, taxpayer identification number, address, and debt amount. State tax agencies also send delinquent tax debts to the U. S. Department of the Treasury for offset using the same program. States also have similar programs that offset State tax payments to collect debts owed to State agencies.

One problem encountered by current offset programs is that individuals routinely change their last name as a result of marriage or divorce. Other problems arise when individuals use more than one last name or names with a hyphen. Debtors owing debts to governments generally do not notify the agency to which they owe a debt of the name change. Federal and State agencies seeking to collect delinquent debts use the name they had on file at the time the debtor incurred the debt to Treasury or State tax departments. The payment agency makes a payment, such as a tax refund, to the current name. However, the debtor name and the payee name are different even though it is the same individual. The payment is not offset and the debt is not collected. Public monies are therefore not recovered.

The objective of this invention to provide an automated program that agencies can use to obtain additional names associated with debtors in order to increase collections through offset programs.

Government agencies have information on their debtors in various different systems and formats. Generally, the agency does not have updated information on debtor name changes nor have they formatted names such as those with hyphens and compound names in a manner to ensure offset. Data vendor systems contain information on names and addresses needed by the government agency to obtain and verify additional names associated with their debtors. The problem the government agency experience is matching their systems' data on names and addresses associated with their debtors with data from vendors, validating such data, and providing the additional names in a format acceptable by Treasury and State tax agencies. This invention provides an automated match of data that otherwise would have to be done manually. The invention comprises computerized matching of data from multiple sources to produce matched results. Use of this invention will identify and verify additional names associated with debtors, and provide these names to agencies for inclusion in TOP and other similar State collection programs. The names can be used by Federal Treasury and State tax agencies in their programs that offset government payments to collect delinquent debts, thereby increasing the recovery of public funds.

SUMMARY OF THE INVENTION

A computer-implemented method to enable a referring agency to increase collections of debts owed to the referring agency by debtors is provided. The method comprises the steps of:

a. obtaining an input file from the referring agency in any electronic or paper file format, the input file comprising a plurality of debtor records, each debtor record comprising a name, address, and taxpayer identification number of the debtor;

b. loading the input file into a database and assigning a unique identification number to each debtor record;

c. sending the debtor records to one or more sources of public records through secure transmission protocols and obtaining from the one or more sources specific data elements for each debtor record;

d. downloading the specific data elements to the database using the secure transmission protocols and appending the specific data elements to the identification number of each debtor record;

e. comparing the information contained in the debtor records with the public records to create a list of matched debtor records, and creating a confidence score for each matched debtor record based on predetermined criteria;

f. generating from the confidence score for each matched debtor record a potential list of different names that have been used by each debtor; and g. creating an output file, converting the unique identification number for the debtor record back to the referring agency taxpayer identification number, the output file comprising additional names for certain debtors, and transmitting the output file to the referring agency through secure transmission protocols to enable the referring agency to offset debts owned by a debtor against any payments owed to the debtor.

Payments owed by the debtor may include loans, grant overpayments and non-payment of taxes. The debtors may be individuals or businesses such as corporations, partnerships, and sole proprietors.

The method may further comprise, prior to step (c), the step of reformatting the debtor records so that each debtor record has a specific format, wherein the specific format includes the identification number of each debtor record. During step (c), the debtor records are sent to the contracted sources of public records only for the permissible purposes allowed under applicable laws and regulations.

The method may include the further step of enriching and making the input data more accurate by eliminating debtor records that should no longer be included in an offset process by the referring agency because of legal or other exclusions. The legal or other exclusions may include debtor bankruptcy and death.

The method may comprise the additional step of identifying a risk of legal and other public relations exposure to the referring agency by identifying and classifying input file errors where the referring agency should take additional steps to ensure that the debtor record is valid. This additional step may comprise identifying those debtor records with mismatched taxpayer identification numbers or debtor names.

The step of creating a confidence score may include using multiple levels of data matching comprising taxpayer identification number, name, name history, address and address history.

Step (e) may further include creating a separate confidence score for each one of a set of values that matches or does not match in a progressive sequence between each debtor record and the public records. The values to be compared may include social security numbers, first names, last names, addresses, address histories and dates of birth. Alias names may be appended to the debtor records using the confidence score generated in step (e).

Step (f) may include using pre-defined business rules that are applied by and generated through a computer program.

Prior to step (g), the user may compare each name from the confidence score to the debtor name on the input file debtor record in order to remove duplicate name records.

Input debtor names may be compared to the additional names so that duplicates can be removed.

The referring agency can select or de-select confidence scores based on the referring agency's internal requirements. In addition, the referring agency may have the ability to send the input data via Internet or other direct connection access. The referring agency may also send, receive and upload and download debtor records through secure electronic means with encryption and other devices in multiple formats, media, and methodologies comprising Internet, File Transfer Protocol (FTP site), and email, and may select or de-select the predefined business rules based on the agency's internal requirements.

THE DRAWINGS

FIG. 1 is a schematic diagram showing the flow of information between the referring agency, the user and the information source(s) according to the invention.

DETAILED DESCRIPTION OF THE INVENTION

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments. In particular, while the invention will be described in terms of a Federal government offsetting program, it can be also be used for State government offsetting programs or wherever an offsetting program is needed.

Federal government agencies ("referring agencies") that are owed debts by individuals or businesses seek to collect those debts. Debtors who do not voluntarily repay their debts can have the debt collected involuntarily through the U. S. Department of the Treasury ("Treasury"). These debts include child support, student loans, benefit and contractor overpayments, income taxes, and other debts owed to Federal agencies, as well as State tax debts. The agencies provide due process to debtors and submit debtor information to Treasury.

Federal agencies generally are authorized to collect these delinquent debts by offsetting Federal payments due to the individuals or businesses by the amount owed by the same individuals or businesses. To accomplish this offsetting, the Federal agencies send information in a specified form to the U. S. Department of the Treasury Offset Program ("TOP") regarding these delinquent debts.

Federal agencies prepare and send payment vouchers to Treasury, which then disburses the funds. Federal payments include Federal income tax refunds, Federal salaries, and vendor and contractor payments.

Before the payment is disbursed, Treasury compares information in the debtor information with payment information. If the information matches, Treasury offsets the payment in whole or part to satisfy the debt and sends the offset funds to the agency holding the debt. If the information does not match, the payment is disbursed without an offset.

In October 2006, the National Center for Health Statistics estimated 11% of individuals are divorced or married each year. These statistics do not include the States of California, Georgia, Hawaii, Indiana, Louisiana, and Minnesota. Individuals who change their names generally do not notify the Federal or State agency that they owe debts of their name change. If the agency uses the name on file and the individual uses their new name on their tax return, the payment will not be offset if the additional name has not been added to the TOP Treasury provides specific file formats and guidance for referring agencies to follow to send debts to TOP for collection. Data sent to Treasury includes the debtor name, address, taxpayer identification number, and amount of the debt. The design of the TOP file format allows the referring agency to add additional names associated with the debtor. Most agencies do not add these additional names to TOP because of their systems' design, lack of information, or inability to obtain the additional information.

When the debtor name is added to the TOP database, a name control, which consists of the first four characters of the debtor last name, is system generated and added to the TOP database. Treasury does not use the debtor entire name in their match, only the name control. Likewise, a name control is generated from the Payee's last name. Treasury compares the debtor name control and the payee name control. If the name controls match the payment is offset; if not, the payment is issued in full. This invention will produce additional names associated with debts.

A significant number of debts are not being offset because the debtor name and payee name do not match even though they are the same individual. This invention includes a method of identifying additional names associated with a debtor and providing those names in a format that can be sent to Treasury or to the State tax agencies for inclusion in their debtor database. After the additional name is added, future payments can be matched and offsets made.

The following table provides examples of offsets that might be missed because the debtor and payee names do not match.

TABLE 1

Unmatched Debtor and Payee Names

| Debtor Name | Payee Name |
|---|---|
| Sharon Green | Sharon Green Johnson-Steward |
| Marcus Smith-Miller | Marcus Miller-Smith |
| John Zavala | John Zavala Jacoo |
| Sondra Smith | Sondra Brown |
| Robert Fagen | Robert E. Fagan |

In the example for Sharon Green, GREE is the name control on the debtor record; JOHN is the name control on the payment.

In the example for Marcus Smith-Miller, SMIT is the name control for the debtor record; MILL is the name control on the payment.

In the example for John Zavala; ZAVA is the name control for the debtor record; JACO is the name control on the payment.

In the example for Sondra Smith, SMIT is the name control for the debtor record; BROW is the name control on the payment.

In the example for Robert Fagen; FAGE is the name control for the debtor record; FAGA is the name control on the payment.

The present invention can obtain from various sources one or more additional names associated with a debtor, verify that an additional name represents the same person listed on the debtor name list and, if there is a match, provide those additional names to the agency that is owed by the debtor. The agency then, in turn, can send that information to Treasury, which can then offset a subsequent payment to the payee.

The verification of additional names representing the same person involves a computerized process of assigning scores to each data element that matches and cross referencing those matched elements to other elements to generate additional matches. As each data element is matched, a score for that element is generated. A sum of the scoring for all data elements matched is generated. A confidence score is established which represents a range of scores that have been identified as meeting criteria that the data matches The present method can be described as a series of steps as follows. In this example, the entity practicing the invention is referred to as the "user".

Referring to FIG. 1, as in initial step, the referring agency ("Agency") 12 and the user 14 define and agree on business rules that will control the offsetting process. For example, the Agency 12 can set rules for acceptable match scores, the handling of other data such as social security numbers ("SSN") for deceased and bankrupt persons, and the handling of invalid SSNs, such as when the Agency 12 has an incorrect SSN for a particular debtor.

Next, the Agency or Agencies 12 send an input file ("input data") through secure transmission protocols to the user 14 comprising information regarding debts currently in offset programs and new debts not yet in offset programs. The format of the input file may vary from agency to agency. The input file generally comprises a plurality of debtor records, with each debtor record including at least the debtor name, taxpayer identification number ("TIN"), agency debtor number, and amount owed by the debtor.

The user then loads the input data into the user's database, and assigns a unique identification number to each debtor record. This identification number is necessary because the user receives files in different formats from different agencies and must convert the data into a common format for inclusion in the database. The identification number also is used to track the debtor record throughout the various process steps.

Next, the user 14 sends requests for information to various information sources 16 ("vendors") through secure transmission protocols to obtain specific public and proprietary data ("specific data elements"). Preferably, the user 14 has established relationships with these vendors 16 and pre-defined the data needed, so that the data complies with the user's permissible purpose under appropriate laws and regulations.

The user 14 receives the data ("public records") from the vendors 16 using secure transmission protocols and appends the specific data elements to the debtor records in the database using the unique identification number to create enhanced debtor records. The enhanced debtor records comprise multiple names and addresses associated with each debtor, as well as information such as bankruptcy, deceased, and fraud indicators.

The user 14 then compares the debtor information contained in the enhanced debtor records in the database with the public records using pre-defined criteria. Each specific data element in the appending record is compared and assigned a scoring based on multiple levels of data matching comprising TIN, Name and Name History, Address and Address History, and other data elements.

The user 14 generates a list of additional names used by the debtor from the matched records based on scoring that meets established confidence scores.

Next, the user 14 creates an output file, converting the unique identification number back to the Agency 12 debt number from the input file, comprising additional names for debtors.

In addition, the user 14 may identify debtor records that should no longer be included in an offset process by the agency 12 because of legal or other exclusions. These include records for debtors that have a bankruptcy, are reported deceased, where the TIN is invalid, or where there is identified fraud on the TIN.

Thus there has been described a method to provide an automated program that can be used to provide Federal or State agencies with additional names associated with their debtors in order to increase collections through offset programs. It should be understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. A computer-implemented method to enable a government referring agency to increase collections of debts owed to the government referring agency by a debtor, the method comprising the steps of:

a. obtaining an input file from the government referring agency in any electronic or paper file format, the input file comprising one or more debtor records, each debtor record comprising a first name, last name, address, and taxpayer identification number of the debtor, each debtor record having been created by the government referring agency when a payment due to a debtor from a payer agency such as the U.S. Treasury is not matched to a debtor record because the debtor's last name on the government referring agency debtor record and from the payer agency do not match;

b. loading the input file into a database and assigning a unique identification number to each debtor record to ensure that multiple alias last names associated with the same debtor record are all maintained under one identifier, where an alias last name is a different last name or a last name variation used by the government referring agency's debtor;

c. sending the debtor records to multiple sources of public and proprietary data through secure transmission protocols and obtaining from the multiple sources specific data elements for each debtor record, wherein the specific data elements include a match to the debtor taxpayer identification number and the associated last and first names and addresses, and where public records are those records available publicly and freely and whereas proprietary records are those which are controlled by privacy rules and require specific allowable purpose to access such records on individuals usually only available to creditors and government referring agencies;

d. downloading the specific data elements returned by the public and proprietary data sources to the database using the secure transmission protocols and appending the specific data elements to the assigned unique number of each debtor record;

e. comparing the information contained in the debtor records with the specific data elements in the public and proprietary data to create a list of matched debtor last name records, and creating a confidence score for each matched debtor last name record based on a user's pre-determined criteria;

f. generating from the confidence score for each matched debtor record a list of potential alias last names that have been used by a debtor; and g. creating an output file, converting the unique identification number for the debtor record back to the referring agency taxpayer identification number, the output file comprising the potential aliases for certain debtors, and transmitting the output file to the referring agency through secure transmission protocols to enable the referring agency to offset debts owed by a debtor against any payments owed to the debtor.

2. The method of claim 1, further comprising, prior to step (c), the step of reformatting the debtor records so that each debtor record has a specific format, wherein the specific format includes the identification number of each debtor record.

3. The method of claim 1 wherein, during step (c), the debtor records are sent to the public and proprietary data sources only for the permissible purposes allowed under applicable laws and regulations.

4. The method of claim 1 comprising the further step of making the input file more accurate by eliminating debtor records that should no longer be included in an offset process by the referring agency because of legal or other exclusions.

5. The method of claim 4 wherein the legal or other exclusions include debtor bankruptcy and death.

6. The method of claim 1 comprising the additional step of identifying a risk of legal and other public relations exposure to the government referring agency by identifying and classifying input file errors where the government referring agency should take additional steps to ensure that the original debtor record itself is valid where the step includes removing a debtor from the government referring agency input file because an obvious error exists where the debtor taxpayer identification number belongs to an unrelated party and such unrelated party will be negatively affected along with an impact to the government referring agency and where the step includes comparing the first name of the debtor to the first name on the payment record.

7. The method of claim 6 wherein the step of identifying a risk of legal and other public relations exposure further comprises identifying debtor records with mismatched taxpayer identification numbers or debtor names.

8. The method of claim 1 wherein step (e), creating a confidence score, comprises matching multiple levels of data, the data including taxpayer identification number, name, name history, address and address history.

9. The method of claim 1 wherein step (f) includes using pre-defined business rules that are applied by and generated through a computer program.

10. The method of claim 1, comprising the further step, prior to step (g), of comparing each additional name to the debtor last name on the input file debtor record, and removing duplicate and same last name records.

11. The method of claim 1 wherein step (e) further comprises creating a separate confidence score for each one of a set of values that match or do not match in a progressive sequence between each debtor record and the public and proprietary data sources, the values comprising social security number, first names where they match, last name, address, address history and date of birth.

12. The method of claim 1 wherein different and previously unavailable debtor alias last names are appended to debtor records using the confidence score generated in step (e).

13. The method of claim 1 wherein each debtor last name from the input file is compared to the additional last names, and duplicates are removed.

14. The method of claim 1 wherein the referring agency can select or de-select confidence scores based on the referring agency's internal requirements.

15. The method of claim 1 wherein the debtors comprise individuals, corporations, partnerships, and sole proprietors who are specifically included in the government referring agency's debtor files and whose payments are not offset due to a non-match of last name.

16. The method of claim 1 wherein the payments owed by the debtor may include loans, grant overpayments and non-payment of taxes.

17. The method of claim 1 wherein the referring agency is provided with the ability to send the input data via Internet or other direct connection access.

18. The method of claim 1 wherein the referring agency can send, receive, upload and download debtor records through secure electronic means with encryption and other devices in multiple formats, media, and methodologies comprising Internet, File Transfer Protocol, and email.

19. The method of claim 8 wherein the referring agency is provided a method to select or de-select the predefined business rules based on their internal requirements.

* * * * *